S. Raymond.
Hay Fork.

No. 2273. Reissued June 5. 1866.

WITNESSES:
J. W. Coombs
G. W. Reed

INVENTOR:
Squire Raymond
by Munn & Co
attys

UNITED STATES PATENT OFFICE.

SQUIRE RAYMOND, OF VENICE, NEW YORK.

IMPROVEMENT IN HORSE HAY-FORKS.

Specification forming part of Letters Patent No. 36,915, dated November 11, 1862; Reissue No. 2,273, dated June 5, 1866.

*To all whom it may concern:*

Be it known that I, SQUIRE RAYMOND, of Venice, Cayuga county, New York, have invented a new and Improved Horse-Pitchfork and Device for Elevating Hay, Straw, or other Substances into Lofts or Mows; and I do hereby declare that the following is a full and exact description of the same, reference being had to the accompanying drawings, making a part of this specification, in which—

Figure 1:
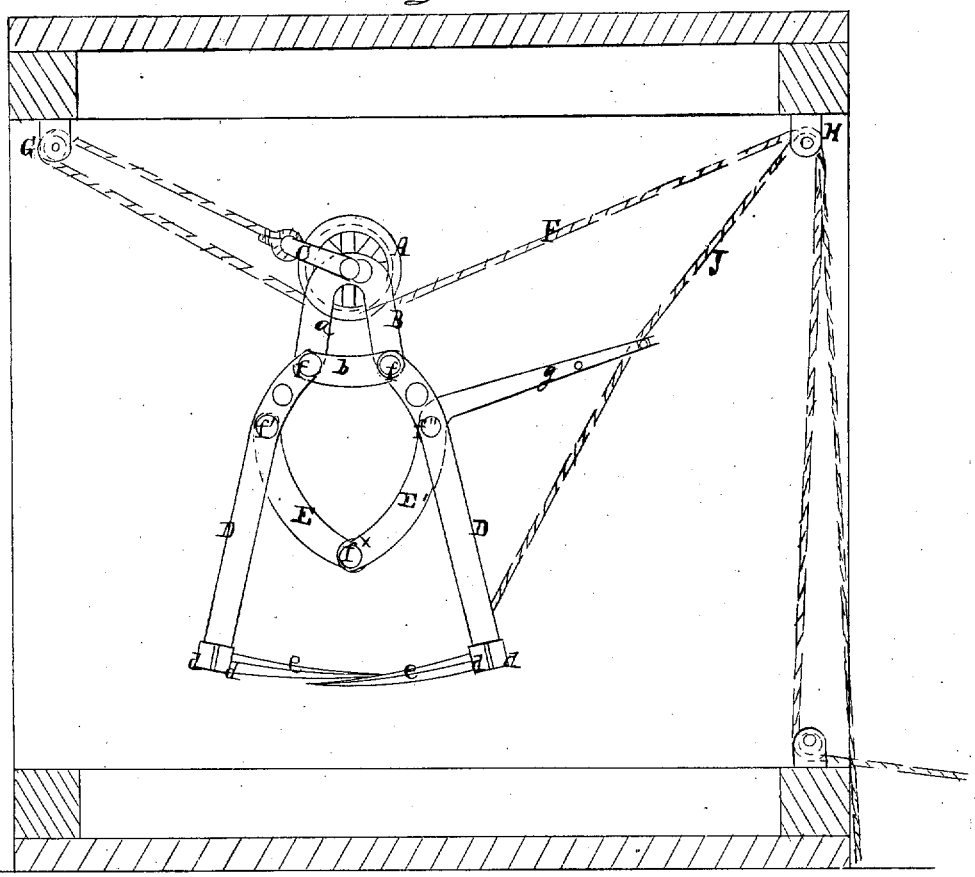
Figure 2:
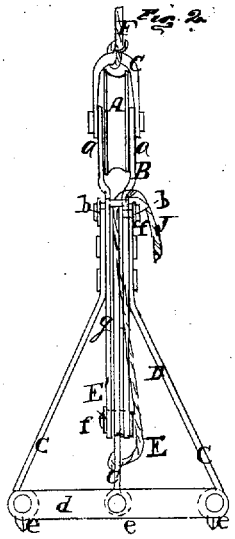

Figure 1 is a side view of the invention, and Fig. 2 an end view thereof.

Similar letters indicate corresponding parts.

This invention relates to the form, construction, and arrangement of the parts and mode of operation, by means of which the hay or other substance to be raised is not only elevated, but may be carried in any direction that may be desired and the load discharged from the forks at will by a very simple manipulation of the operator.

A is a pulley; B, its frame; C, a loop or eye on its upper end.

The pulley and frame may be of cast-iron, and the frame composed of two U-formed side pieces, *a a*, connected at the lower side by bars or straps *b b*.

D D′ are two fork-arms, composed each of three iron bars, *c c c*, arranged in V form, as shown in Fig. 2, and are connected at their lower ends to cross bars or heads *d d*, in which the teeth *e e e* are secured at right angles, said teeth being slightly curved upward, as shown in Fig. 1. The upper ends of the fork-arms D D′ are secured to the opposite ends of the pulley-frame B by the joints *f f′*.

E E′ are two arms or levers for opening or closing the forks. They are jointed to the arms D D′, and are connected at their inner ends by the pivot $f^{\times}$. E′ has an extension, *g*, on its opposite end, as shown in Fig. 1.

G and H are pulleys, attached to elevated parts of the barn or hay-loft in such relative position that the line between them will pass over or near the hay to be elevated and the spot where the load is to be deposited.

I is another pulley near the ground.

F is the draft-rope, one end of which is attached to the eye C of the pulley A, and is then passed over and around the pulley G, under the pulley A, and over and around the pulley H, and under the pulley I, and to this end the horse is attached.

J is a cord attached to the fork-arm D, and then passed through an eye in the extension *g* of the lever E′, and over a pulley H′ at the side of the pulley H.

The operation is as follows: The forks are distended and placed in the hay to be elevated and the horse is started. The draft closes the forks and the hay is carried upward and in the direction of the pulley G. When the load is over the place where it is desired to deposit it, it is dropped by drawing on the end of the cord J, which operates the levers E E′ and distends the forks.

By this arrangement all catches and springs to hold the forks together are unnecessary, and the load is raised and carried to the point desired readily and without being dragged or swung round by hand, while the system of pulleys enables the horse to raise twice the load he can do over a single pulley.

I claim—

1. The combination of the fork-arms D D′, turning or opening at their extreme upper ends, and the levers E E′, constructed and operating substantially as described.

2. The pulleys A, G, and H, arranged and operating in combination with the rope F, substantially as described, for the uses and purposes mentioned.

3. The fork-arms D D′, the levers E E′, with the extension *g*, all used in combination with the rope F and cord J, arranged as and for the purpose set forth.

SQUIRE RAYMOND.

Witnesses:

ABRAM W. STEVENS,

S. T. MASTIN.